United States Patent [19]

Turley et al.

[11] Patent Number: 4,911,993
[45] Date of Patent: Mar. 27, 1990

[54] BIPOLAR, FILTER-PRESS, CONSUMABLE METAL ANODE BATTERY

[75] Inventors: Homer L. Turley, Painesville; Marilyn J. Niksa, Concord; Richard J. Coin, Mentor; Thomas J. Schue, Huntsburg, all of Ohio

[73] Assignee: ELTECH Systems Corporation, Boca Raton, Fla.

[21] Appl. No.: 150,797

[22] Filed: Feb. 1, 1988

[51] Int. Cl.$^4$ .......................... H01M 4/00; H01M 2/08
[52] U.S. Cl. .......................................... 429/27; 429/35
[58] Field of Search .............................. 429/27, 35, 36

[56] References Cited

U.S. PATENT DOCUMENTS

| | | | |
|---|---|---|---|
| 3,462,307 | 8/1969 | Voorhies | 136/86 |
| 3,598,655 | 8/1971 | Hamlen et al. | 136/86 |
| 3,834,944 | 9/1974 | Dennison | 136/86 |
| 4,091,174 | 5/1978 | Ruch et al. | 429/27 |
| 4,246,324 | 1/1981 | de Nora et al. | 429/17 |
| 4,389,466 | 6/1983 | Joy | 429/27 |
| 4,463,064 | 7/1984 | Ruch et al. | 429/27 |
| 4,551,399 | 11/1985 | Despic | 429/27 |
| 4,560,626 | 12/1985 | Joy | 429/27 |
| 4,590,134 | 5/1986 | Warszawski et al. | 429/35 |
| 4,693,946 | 9/1987 | Niksa et al. | 429/27 |
| 4,714,662 | 12/1987 | Bennett | 429/27 |
| 4,725,347 | 2/1988 | Pimlott | 204/254 |

FOREIGN PATENT DOCUMENTS

| | | | |
|---|---|---|---|
| WO84/02429 | 6/1984 | PCT Int'l Appl. | |
| 1028548 | 5/1966 | United Kingdom . | |
| 1223127 | 2/1971 | United Kingdom | 429/27 |

Primary Examiner—Stephen J. Kalafut
Attorney, Agent, or Firm—John J. Freer

[57] ABSTRACT

A bipolar battery having a consumable metal anode and being of the filter-press type is described. Internal battery contact is obtained by pressure connection transmitted virtually all, to completely, by end bulkheads. A multitude of adjoining cells can be placed together in a bipolar assembly cell stack. Yet the battery is compact and lightweight.

22 Claims, 6 Drawing Sheets

BIPOLAR, FILTER-PRESS, CONSUMABLE METAL ANODE BATTERY

BACKGROUND OF THE INVENTION

In batteries using air cathodes and consumable metal anodes, there have been proposed forms into which electrodes can be secured. In U.S. Pat. No. 4,246,324, box-like forms have been used with electrodes that are positioned on opposing faces of the form. Electrolyte is maintained between the facing electrodes and the consumable anode can be of plate shape, secured in the box-like form by spring clips.

In the U.S. Pat. 4,091,174 there have been shown rod-shaped consumable electrodes. These can be secured in apertures of similar concentric shape and springs may be useful for maintaining this particularly shaped consumable electrode closely adjacent an air electrode. As shown in the U.K. Patent No. 1,223,127 the air electrode may be separated from the consumable electrode by strips across the face of a plate-like air electrode. Furthermore, these strips may have projections, like tiny nubs, that maintain a spacing between a consumable electrode, which can be in plate-like form and the air electrode. A sequence of these members are taught to be capable of being bound together and then external spring can be wrapped around such bound grouping for maintaining pressure between the internal battery members.

It has been more recently taught in the U.S. Pat. No. 4,693,946, that the air cathode can be provided as a module. The module can have a screen surface reinforcement on the cathode face and such elements are firmly crimped and sealed into a metal frame, thereby providing a module. The cathode can be spaced apart from the consumable anode by a cage which serves as an anode holder. The cage may be V-shaped, whereby useful anodes are wedge-shaped.

It has also recently been shown in U.S. Pat. No. 4,551,399 that the cathode can be mounted on arms, and the arms wired. The arms can then penetrate through a separator wall and thereby be in contact with an anode on the far side of the wall. The anode may be wedge shaped with the backside conforming with the straight separator wall and the angled side being in a plane parallel to the plane of the cathode.

Ribs running across the face of a cathode, maintaining anode/cathode separation, have also been shown to be useful in the U.S. Pat. No. 4,389,466. On the cathode backside, a porous, rigid support may be used. The porosity of the support permits air to flow through the support element and yet be in contact with the cathode. On the anode side, an expandable bladder is used to maintain pressure on the anode and force it against the ribs to make good electrical contact between ribs and anode. Alternatively, as shown in the more recent U.S. Pat. No. 4,560,626, the bladder can be used in conjunction with coiled springs maintained at the same part of the battery as the bladder. The bladder is again useful for maintaining internal pressure. However, during anode replacement, the internal springs can be useful, against the pressure of the bladder, for retracting the cathode away from the anode so that the anode can be easily replaced.

Most recently in U.S. patent application Ser. No. 056,567 it has been taught to provide a current collector member within a cell, with such member having compressible elements that at least assist in the force holding internal cell parts together. These compressible elements can extend across a cell air space and be in contact with an electrically conductive, foraminous metal member. By such means it has been possible to produce a bipolar battery of excellent energy efficiency.

It is apparent that many desirable features have therefore been investigated in many aspects of providing a more long life operation to batteries employing consumable electrodes. However, certain combinations of features, packaged in efficient manner, and including a bipolar battery package of a lighter weight and compactness would still be highly desirable. Maintenance of a sealed cell to prevent electrolyte loss and allow pressure operation would be advantageous.

SUMMARY OF THE INVENTION

An improved and highly efficient consumable metal anode battery has now been constructed. The battery is of bipolar, filter press-type construction, thereby affording low weight but without deleterious reduction in energy output. Moreover battery volume is reduced to a most desirable compact size. Individual battery cells can be operated under pressure and in a sealed fashion thereby reducing electrolyte loss.

In one broad aspect, the invention relates to a bipolar, filter-press, consumable metal anode battery having a cell comprising a gas diffusion cathode assembly embodying an electrically conductive metal element, the element being extended from the cathode assembly into pressed, electrically conducting contact with an electrically conductive, plate-like metal member inert to the cell environment and spaced apart from a broad face of the air cathode, with there being in the cell a consumable metal anode having a broad face in interfacial contact with a broad face of the plate-like metal member.

In yet other aspects, the invention relates to a compact, bipolar battery wherein cell compression is exerted simply by the end members. Moreover cell feeds and effluents can be manifolded through a single end member.

In yet other aspects, the invention relates to a battery cell containing a consumable metal anode plus adjacent metal member each having a perimeter that is larger than the perimeter of the effective cathode surface. Further aspects include a cathode having electrically conductive elements extending therefrom, yet firmly bound with the cathode.

DESCRIPTION OF THE PREFERRED EMBODIMENTS

For consumable metal anode batteries, electrical energy is released by the dissolution of metal at the anode and reduction of fuel at the cathode. Cathode fuel can include gaseous $SO_2$, $Cl_2$ and oxygen. But, hereinafter, such as for use in describing apparatus, the word "air" may be employed for convenience, e.g., as in the term "air inlet port". This is meant to include not only an oxygen fuel source, which understandably can therefore be other than air, e.g., oxygen and other gaseous mixtures including oxygen, but also to more broadly include any useful gaseous or similarly employed fuel substance or mixture. Thus in place of a gas at the cathode it is contemplated that other fluid fuel may be utilized, e.g., oxygen dissolved and transported in a liquid medium such as silicone oil. Moreover, although it is broadly contemplated that a gas diffusion electrode will be used for the cathode, this will most always be an air cathode. In keeping with the convenience of the use of the word "air" as mentioned hereinabove, the electrode may generally be referred to hereinafter simply as an "air cathode" for convenience.

The metals contemplated for dissolution at the anode are aluminum, zinc, lead, calcium, beryllium, lithium and magnesium as well as alloys and intermixtures of same, but aluminum is preferred for economy and efficient electrical generation. Serviceable electrolytes are preferably aqueous, including saline solutions such as seawater, but are most always caustic, e.g., solutions of sodium hydroxide or potassium hydroxide or caustic mixtures containing same and further including caustic saline solutions.

Figure 1:
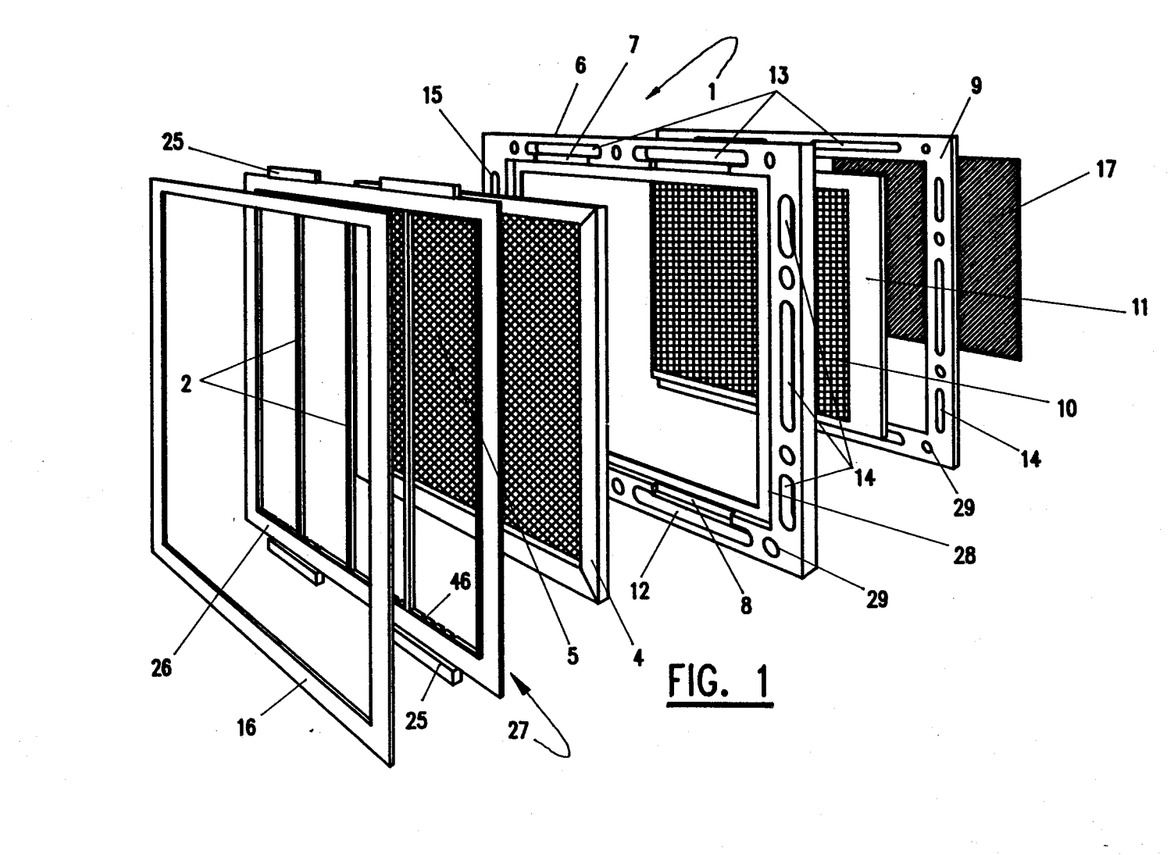
FIG. 1 is an exploded view showing a cell unit for a bipolar, filter-press type battery of the invention.

In reference to the drawings, the same identifying number has generally been used for the same element in each of the Figures. Referring then to FIG. 1, a cell unit shown generally at 1, for the bipolar filter press battery, has a metal anode 17. When in place in the cell unit 1, this metal anode 17 is surrounded at its perimeter by a perimeter gasket 9. Within the perimeter gasket 9 are tie rod holes 29 useful for passing connecting elements, not shown, utilized in the battery assembly. The perimeter gasket 9 is similarly perforated with air inlet channels 14 and electrolyte outlet channels 13. The metal anode 17 faces against a metal plate 11 which serves as the anode current collector. On the reverse face from the metal anode 17, the metal plate 11 face against a cathode support mesh 10.

Around the perimeter of the cathode support mesh 10, is a cell frame 6. The cell frame 6 is perforated with tie rod holes 29 as well as with air inlet channels 14 and air outlet channels 15. Moreover, the cell frame 6 contains the electrolyte outlet channels 13 plus the electrolyte inlet channels 12. The electrolyte outlet channels 13 connect to electrolyte outlet slots 7. Likewise, the electrolyte inlet channels 12 connect to electrolyte inlet slots 8.

Moving forwardly in the FIG. 1 from the cell frame 6, the cell unit 1 next contains an air cathode 5 enclosed within an air cathode frame 4. The air cathode 5 plus frame 4 are contained within the cell frame 6 on the cathode ledge 28. Opposite the cathode ledge 28, the air cathode 5 faces a spacer assembly 27 containing a spacer rim 26. Connecting two of the opposite edges of this spacer rim 26 are spacer assembly separator bars 2. The spacer rim 26 likewise contains spacer assembly flanges 25, all of which are provided on the obverse side with flange flow channels, not shown. These flange flow channels connect with electrolyte flow channels, e.g., the flow channels of the lower spacer assembly flanges 25 connect with inlet electrolyte flow channels 46. The spacer assembly 27 adjoins up against an anode facing gasket 16. This anode facing gasket 16 can then join up against a metal anode, not shown, for the next cell unit.

Figure 2:
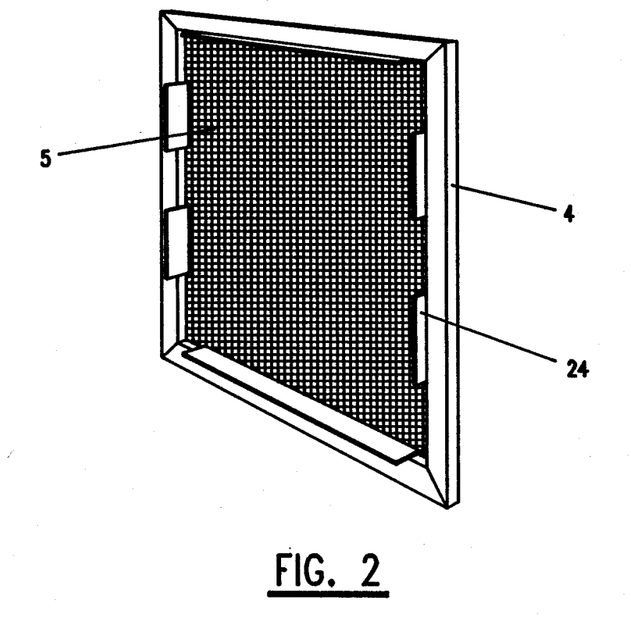
FIG. 2 is an isometric view of a cathode subassembly for the bipolar battery cell.
Figure 2A:
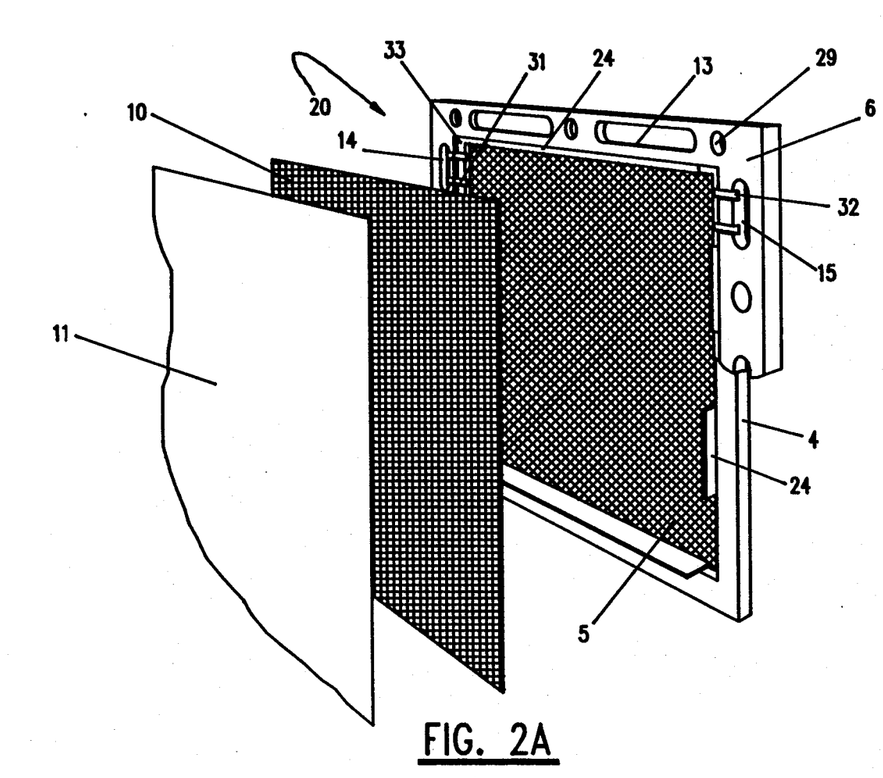
FIG. 2A is an exploded isometric view showing a framed cathode assembly with permeable support.

Referring to FIG. 2, the air cathode 5 is depicted from the reverse side of that shown in FIG. 1. The air cathode 5 has an air cathode frame 4. Within this frame 4 there are held cathode tab elements 24. Then as shown in FIG. 2A, which showing is also from the reverse side of that shown in FIG. 1, there is depicted a cathode assembly shown generally at 20. In the assembly 20 the cell frame 6, shown in partial section, has tie rod holes 29, as well as electrolyte outlet channels 13 and air inlet channels 14. The air inlet channels 14 contain air inlet slots 31. The cell frame 6 likewise contains air outlet channels 15 which connect to air outlet slots 32. The cell frame 6 has a cathode metal plate ledge 33. When the air cathode 5 is present within the cell frame 6, the air cathode tab elements 24 from the air cathode frame 4 are folded onto the cathode metal plate ledge 33 thereby assisting in securing the air cathode 5 within the cell frame 6. The air inlet slots 31, as well as the air outlet slots 32, are channeled within the cell frame 6 between the air cathode tab elements 24. By this arrangement, air entry and exit will be unimpeded by the air cathode tab elements 24 placed on the cathode metal plate ledge 33. The cathode support mesh 10, is then placed up against the air cathode 5 within the confines of the cathode metal plate ledge 33. Then, a metal plate 11 is placed onto the cathode metal plate ledge 33.

Figure 3:
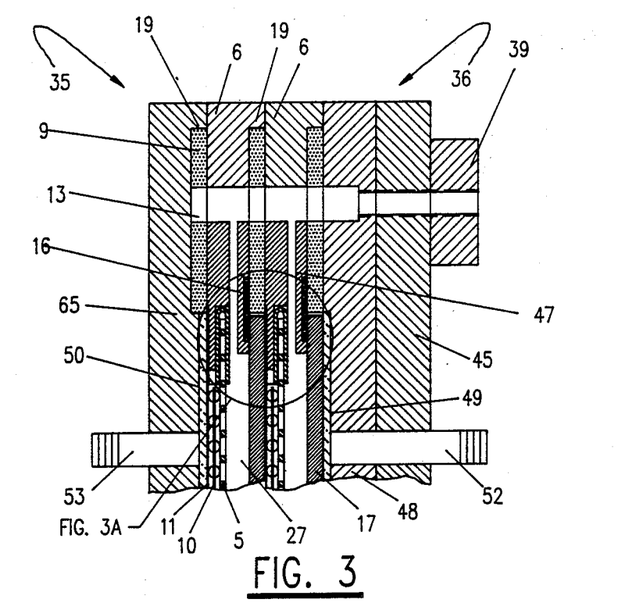
FIG. 3 is a side elevational view of a cell stack depicting two side-by-side bipolar cell units.
Figure 3A:
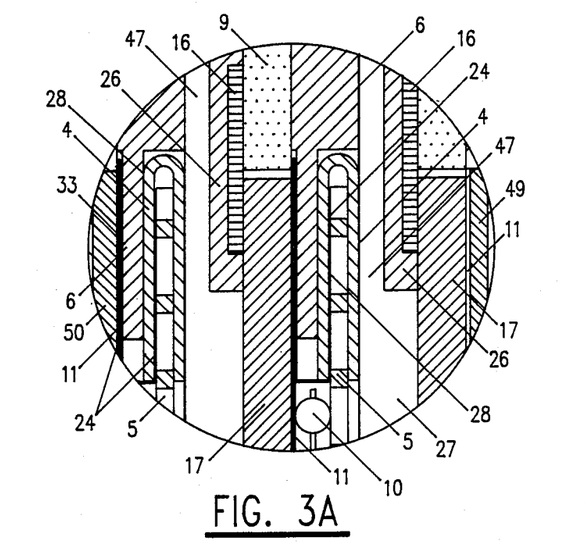
FIG. 3A is a magnified view of a section of the bipolar cell of FIG. 3.

Referring then to FIG. 3, there is depicted broadly, i.e., for convenience the figure generally lacks the detail of the FIG. 3A section of FIG. 3, a showing of a two cell stack between the cathode bulkhead assembly 35 and the anode bulkhead assembly 36. The anode bulkhead assembly 36 is comprised of an outer anode bulkhead plate 45 plus inner anode bulkhead plate 48. Outside the outer anode bulkhead plate 45 is an electrolyte outlet port manifold 39. The cathode bulkhead assembly 35 includes the cathode bulkhead plate 65.

The cathode bulkhead assembly 35 also includes the cathode connector 53 plus cathode terminal current collector 50. Referring more particularly across the bottom of FIG. 3, from left to right and through the first cell of the two cell stack there is depicted the cathode bulkhead 65, cathode terminal current collector 50, metal plate 11, cathode support mesh 10, air cathode 5, spacer assembly 27 and metal anode 17. At the right-hand portion of the second cell the metal anode 17 is adjacent the anode terminal current collector 49 which is attached to the anode connector 52 of the anode bulkhead assembly 36. Within the portion of FIG. 3 amplified more fully in FIG. 3A, there are nevertheless particularly evident certain features including the anode facing gaskets 16 and outlet electrolyte flow channels 47. The flow channels 47 then feed in to the electrolyte outlet channel 13. For each cell unit provided between the bulkhead assemblies 35, 36 there is provided a cell frame 6 plus perimeter gaskets 9 confined within cell frame lips 19.

In FIG. 3A, there is then shown in greater detail the inner connection of the cell units of FIG. 3. More particularly referring to FIG. 3A, anodes 17 are contained within perimeter gaskets 9. At the outer edge of the anode 17, on one broad face, there is contained the anode facing gasket 16. This anode facing gasket 16 is housed against a ledge of the spacer rim 26. For purposes of this figure the spacer has been sectioned to expose outlet electrolyte flow channels 47. These flow channels 47 are oppositely bounded by the cell frame 6 plus the air cathode frame 4. Below the flow channels 47 is a spacer assembly 27. The air cathode frame 4 is crimped around the air cathode 5 as well as the cathode tab elements 24. A face of the crimped portion of the air cathode 5 then abuts up against the cathode ledge 28 of the cell frame 6. The cathode tab elements 24 are then bent back up around the cell frame 6 and in to contact with the cathode metal plate ledge 33. Within a portion o the space within the cell frame 6 and adjacent the resulting U-shaped bent cathode tab elements 24 is a cathode support mesh 10. The cathode support mesh 10 is pressed between an air cathode 5 and a metal plate 11. At the left, the metal plate 11 abuts the cathode terminal current collector 50. On the right of the figure, the metal anode 17 is adjacent the anode terminal current collector 49.

Figure 4:
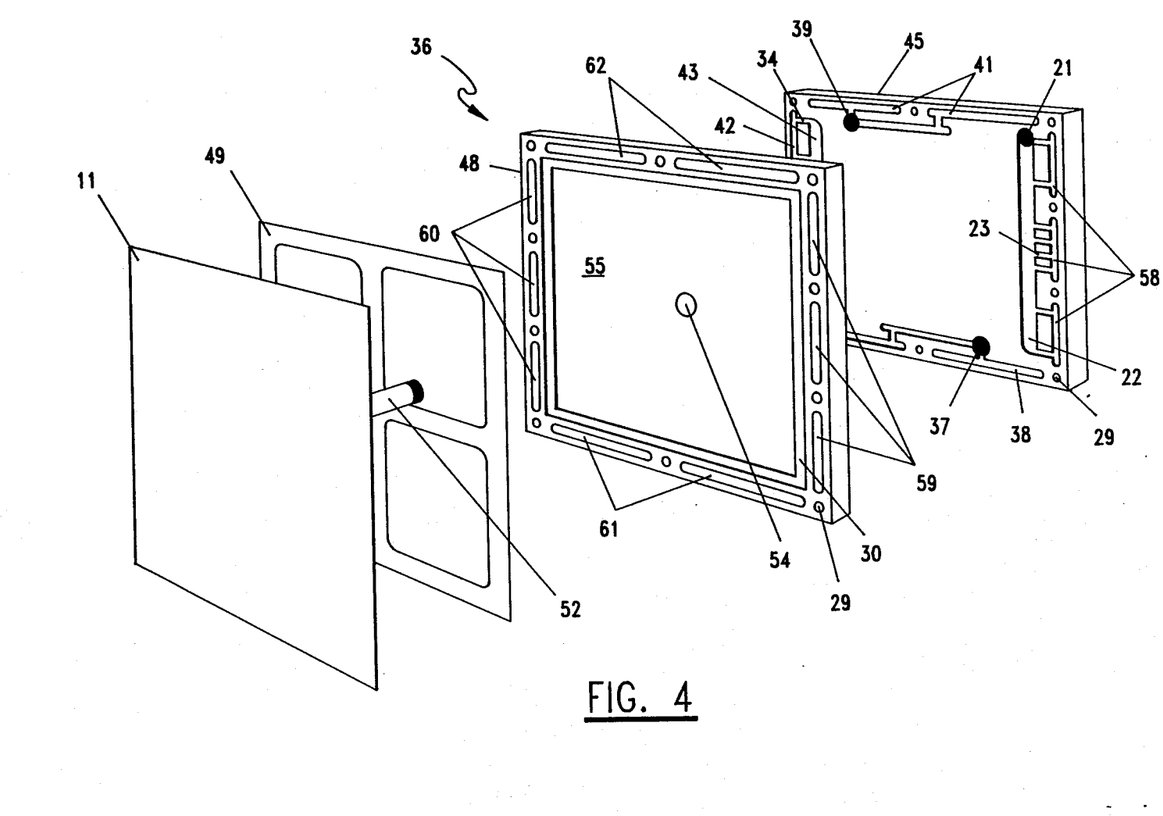
FIG. 4 is an exploded, isometric view of an anode bulkhead assembly.

In FIG. 4, there is shown the anode bulkhead assembly generally indicated at 36. The anode bulkhead assembly 36 includes the outer anode bulkhead plate 45, the inner anode bulkhead plate 48, the anode terminal current collector 49 and anode connector 52. The anode terminal collector 49 is in contact with a metal plate 11.

The outer anode bulkhead plate 45 contains an air inlet port 21 from which air, feeding from a source not shown, passes into an air inlet plenum 22 that connects to air inlet slots 23. These slots 23 feed air through to the air inlet manifold end 58, and then into the air inlet bulkhead channels 59 of the inner anode bulkhead plate 48. The air then flows forward into air inlet channels 14 of a cell frame 6, as shown in FIG. 1. Spent air from air outlet channels 15, shown in FIG. 1, flows into air outlet bulkhead channels 60 of the inner anode bulkhead plate 48. From there it passes through air outlet manifold ends 42 and air outlet slots 34 into an air outlet plenum 43. Spent air departs cell through an outlet port, not shown. Such port, plenum 43, slots 34 and manifold ends 42 are similar in configuration to the air entry system more fully depicted in the figure and discussed hereinabove.

In somewhat like manner to the air feed, the outer anode bulkhead 45 is perforated by an electrolyte inlet port 37 through which electrolyte, from a source not shown, feed to electrolyte inlet manifold ends 38. The manifold ends 38 supply electrolyte to the electrolyte inlet bulkhead channels 61 of the inner anode bulkhead plate 48. These channels 61 feed electrolyte forward to electrolyte inlet channels 12 of cell frame 6 as shown in FIG. 1. Spent electrolyte, from the electrolyte outlet channels 13 in the cell frame 6, as shown in FIG. 1, enters the electrolyte outlet bulkhead channels 62 of the inner anode bulkhead plate 48. It then passes into electrolyte outlet manifold ends 41 of the outer anode bulkhead plate 45 and departs out an electrolyte outlet port 39. The inner anode bulkhead plate 48 also has a recessed face 55 and central aperture 54.

In anode bulkhead assembly, the inner and outer anode bulkhead plates 48,45 are brought together, e.g., by gluing, to initiate the anode bulkhead assembly 36. The anode bulkhead assembly 36 is then continued by fitting the anode connector 52 through the inner anode bulkhead plate central aperture 54 and then through a similar aperture, not shown, in the outer anode bulkhead plate 45. The anode terminal current collector 49 is fitted snugly against the inner anode bulkhead plate recessed face 55. Although this current collector 49 has been shown as an apertured plate, it can also be supplied as a solid plate. Atop the current collector 49, the metal plate 11 is then fitted, e.g., by gluing, against the anode metal plate ledge 30 of the inner anode bulkhead plate 48.

Figure 5:
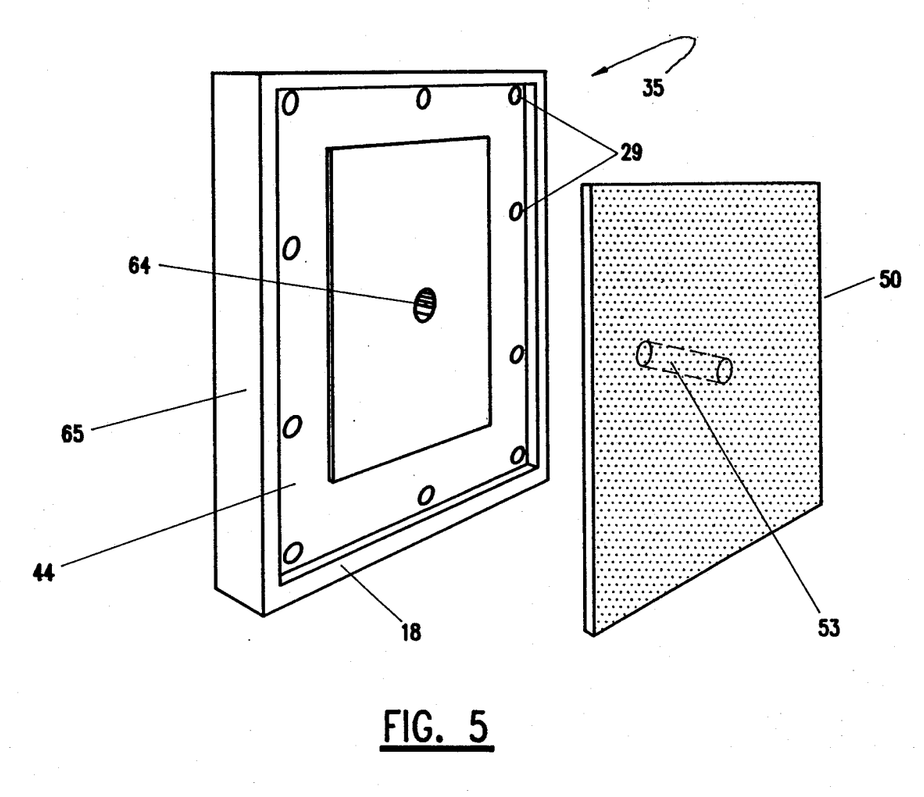
FIG. 5 is an isometric view of a cathode bulkhead assembly.

In FIG. 5, there is shown the cathode bulkhead assembly 35 which combines the cathode bulkhead plate 65, cathode terminal current collector 50 and cathode connector 53. The plate 65 contains tie rod holes 29, a perimeter cathode bulkhead recess 44 and a central aperture 64. The aperture 64 receives the connector 53 and the recess 44 and bulkhead lips 18 serve to contain a perimeter gasket, i.e., the perimeter gasket 9 as shown in FIG. 3.

For assembling a cell, such assembly can be initiated with a pair of opposing bulkhead plates 45,65. These bulkhead plates 45,65, as well as the inner anode bulkhead plate 48, can be made of solid material, advantageously a dielectric material, so that metal tie rod connections can be used. It is preferred for economy that all of the bulkhead plates 45,48 and 65 be made of a machinable or moldable plastic that is resistant to caustic such as acrylonitrile-butadiene-styrene (ABS) resins or chlorinated polyvinylchloride (CPVC) resins and including polypropylene, although the use of other materials is contemplated. When assembly is initiated with the cathode bulkhead assembly 35, a perimeter gasket 9 can be first placed inside the cathode bulkhead lip 18 and in the cathode bulkhead recess 44. Such a gasket 9 can be made from an elastomer made from ethylene-propylene-diene monomer (EPDM), neoprene, vinyl or other like material stable in electrolyte. Then the cathode current collector 50 and the cathode bulkhead plate 65 are brought together, thereby passing the cathode connector 53 through the cathode bulkhead plate central aperture 64.

It is next appropriate to assemble an air cathode 5, with frame 4, in a cell frame 6. Air cathodes 5 mounted in air cathode frames 4, the combination sometimes being referred to herein as "modular air cathodes" have been discussed in U.S. Pat. No. 4,693,946. As an example, the procedures taught in such patent can be useful herein with the derivation that cathode tab elements 24 are included so as to be crimped between the cathode frame 4 and the air cathode 5 during processing. Although it is permissible to form the cathode frame 4 out of a metal such as nickel or its alloys, e.g., Monel, it is also suitable to use a thermoplastic resin such as polyvinyl chloride (PVC), polypropylene and elastomers such as EPDM. Thus the cathode frame 4 can be selected to be either electrically conductive or dielectric. The cathode tab elements 24 are flexible elements 24. By this it is meant that such elements 24 have sufficient flexibility to initially extend outwardly from the air cathode 5 as shown in FIG. 2, and then be readily crimped back on to the cathode metal plate ledge 33 as shown in FIG. 2A. These elements 24 can thus be of a metal that is sufficiently thin to permit ease of forming a U-shaped structure, e.g., a metal foil, may be provided by nickel or its alloys as well as stainless steel or silver, and include plated metal such as nickel plated carbon steel, silver plated nickel, nickel plated beryllium-copper and the like.

The resulting modular air cathode is then inserted into the cell frame 6 so as to fit the air cathode frame against the cell frame cathode ledge 28. A simple pressure fit is typically sufficient with the bending of the cathode tab elements 24 back against the cathode metal plate ledge 33 insuring a secure combining of the modular air cathode with the cell frame 6. Additionally, gluing of the air cathode frame 4 to the cell frame cathode inside ledge 28 can be utilized. The materials of construction for the cell frame 6 can be any of those suitably employed for manufacture of the bulkhead plates 45,65.

The cathode support mesh 10 can then be placed in the area of the air cathode 5 defined within the perimeter of the cathode tab elements 24. This cathode support mesh 10 may be simply fit within this area, with no additional binding being needed. Although referred to herein as a "mesh" 10, it is to be understood that any extremely porous or foraminous material, which might not be strictly construed as a mesh, will be useful. Such elements having an open area greater than 90 percent and typically above about 95 percent will be suitable. Preferably, so as to mitigate any deleterious effects such as retarded air flow through the mesh 10 to the air cathode 5 as might be caused by condensing moisture, the mesh 10 will have greater than 95 percent porosity, e.g., 95-98 percent porosity. The mesh 10 may be electrically conductive but will generally be prepared from a dielectric material, e.g., plastic such as polypropylene.

Applied next as a covering over the cathode mesh support 10 and in contact with the cathode tab elements 24 is the metal plate 11. Such a plate can be provided by nickel or its alloys, or stainless steel as well as by plated metal such as a nickel plated metal. For best ease of cell assembly, the metal plate 11 is preferably bonded, e.g., glued, to the cathode metal plate ledge 33 of the cell frame 6. In this bonding, it is important that electrical contact is maintained between the metal plate 11 and the cathode tab elements 24. The bonding of the plate 11 to the ledge 33 maintains these elements in place during further cell assembly. When cells are fully assembled, and in place, bulkhead compression will assist this connection. Also, the electrical contact of the tab elements 24 to a metal plate 11 and subsequent positioning of the metal plate into electrical contact with a metal anode 17 of an adjacent cell, thereby completes the cell-to-cell bipolar connection.

The cathode assembly 20 as described above and as shown in FIG. 2A, is then placed against the perimeter gasket 9 with the metal plate 11 facing the cathode current collector 50. While the cathode assembly 20 can be held simply by bulkhead compression, it is to be understood that for any battery plastic-to-plastic joining, e.g., cathode assembly 20 to cathode bulkhead plate 65, such can be assisted by gluing or heat sealing or solvent welding or combinations thereof. The spacer assembly 27 is then placed on top of the cell frame 6 with the spacer assembly flanges 25 fitting into the electrolyte outlet slots 7 and electrolyte inlet slots 8 of the frame 6. Thus flow channels, e.g., the inlet electrolyte flow channels 46, will face the cell frame 6 plus cathode frame 4. Next, an anode facing gasket 16, which may be made from similar material of construction as for the perimeter gasket 9, can be fit around the spacer rim 26 of the spacer assembly 27. It is suitable for the anode facing gasket 16 to be simply placed around the spacer rim 26 and thereafter held in place by cell compression or the gasket 16 can be glued to the spacer rim 26. It is suitable for the elements of the spacer assembly 27, e.g., the spacer rim 26 and assembly separator bars 2, to be of similar construction to the bulkhead plates 45,65.

Next, the perimeter gasket 9 can be placed on top of the spacer assembly 27 and a metal anode 17 placed inside the perimeter gasket 9 in contact with the anode facing gasket 16. For a single cell battery unit, the anode bulkhead assembly 36 could be added at this point with a metal plate 11 in contact with the metal anode 17. In the alternative, where there will be a two or more cells stack, there will next be placed against the metal anode 17 another cathode assembly 20 with its metal plate 11 contacting the metal anode 17. Again, a perimeter gasket 9 and metal anode 17 would be added to complete a second cell. This sequence, e.g., of adding another cathode assembly 20, perimeter gasket 9, and metal anode 17, can be repeated until the desired number of cells is obtained and then the anode bulkhead assembly 36 added to complete the stack. Bulkhead assembly is completed as has been discussed hereinbefore. Tie rods can then be inserted through assembly tie rod holes 29 and tie rod bolts tightened to complete the bulkhead-to-bulkhead compression.

After an electrolyte feed conduit has been connected with the electrolyte inlet port 37, and electrolyte flow is initiated, the electrolyte will flow though the anode bulkhead assembly 36 in the manner described hereinabove in connected with FIG. 4. Then in reference to FIG. 1 it will be seen that the electrolyte flows through the electrolyte inlet channels 12 and will then proceeds through the inlet electrolyte flow channels 46 of the spacer assembly 27 into the electrolyte chamber defined within the spacer assembly 27. This electrolyte chamber is only partially occupied by the spacer assembly separator bars 2. In this electrolyte chamber, the electrolyte flows between the metal anode 17 and the air cathode 5. Spent electrolyte exits the electrolyte chamber outlet channels which are located in the spacer assembly upper flanges 25 of the spacer assembly 27. From these channels the electrolyte continues to the electrolyte outlet channels 13. From these channels 13 spent electrolyte then feeds to and through the anode bulkhead assembly 36, as discussed hereinabove in connection with FIG. 4.

At the same time, air supply is provided to the anode bulkhead assembly 36, and air flows through same, as described above for FIG. 4. From the channels of the inner anode bulkhead plate 48 air feeds into the air inlet flow channels 14 and from these channels 14 through the air inlet slots 31, as shown in FIG. 2A. The air then proceeds into the air chamber defined between an air cathode 5 and a metal plate 11 and occupied by the cathode support mesh 10. The air sweeping into this cathode support chamber passes into contact with this air cathode 5. Air passing through this air chamber, exits through air outlet slots 32 and channel 15. From there it proceeds to and through the anode bulkhead assembly 36 as previously described hereinbefore.

Electrical connections are made to the anode connector 52 and cathode connector 53 by any suitable method such as bolting a ring conductor to either connector 52,53. The ring conductor can be crimped to a suitable conductor cable which in turn is connected to an electrical load, all not shown.

As can be appreciated particularly by reference to FIG. 3A, the metal anodes 17 are held in place on one broad face at their perimeter by the combination of the anode facing gasket 16 and spacer rim 26 of the spacer assembly 27. These elements 16,26,27, mask the outer perimeter of the metal anodes 17 from contact with electrolyte. Thus, upon full utilization of the anode 17, there will remain at least a substantial perimeter portion of the metal anode 17 that is so masked. Hence cell parts, maintained in place by bulkhead-to-bulkhead compression, will remain fixed in place even after such anode 17 utilization.

It is preferred that the air cathode 5 be doubly gridded, i.e., have a foraminous metal conductor at both the gas supplying cathode side as well as the liquid or active side. By use of the term "foraminous metal conductor" it is meant to include the metal screens and meshes, such as woven wire meshes and screens of usually fine wire, that can be serviceable for impressing into a broad face of a cathode surface for the air cathode 5. On a broad planar surface of the air cathode 5, this conductor, or "cathode screen", therefore serves as a part of the cathode current collector on the gas supply side and may be in contact at its edges with the cathode tab elements 24. Typically, the materials suitable for such cathode screens are silver plated copper wire which may be nickel plated, and preferably are nickel plated but with a silver plate top layer.

The air cathode 5 will be of a porous sheet type construction. Useful cathodes include those prepared typically as a carbon/polymeric binder matrix of a lipophobic (e.g., hydrophobic) polymer. Generally, this structure will be a catalyzed carbon matrixed with particles of halocarbon polymer binders. The hydrophobic polymer will generally contribute from about 10 to about 50 weight percent of the matrix. The carbon typically is very finely divided, e.g., particles are within the range of from about 0.01 to about 0.1 micron. The halocarbon polymer binder, i.e., a fluorocarbon polymer, may be combined with other polymeric materials which also may be finely divided. The carbon in the matrixed material may be activated such as by a platinum catalyst. Such cathodes have been disclosed for example in U.S. Pat. No. 4,354,958 which is incorporated herein by reference for such disclosure. The air cathode 5 will provide a wetproof layer, or gas supplying side, to the cathode support mesh 10. The active material side of the air cathode 5 will thus face the spacer assembly 27.

In assembly, as mentioned hereinabove, cell body segments can be brought together by usual external mechanical means, such as tie rods. No separate, internal fastening of individual elements, e.g., welding or of soldering of the cell frames 6, is thereby necessary. The gaskets 9,16 can provide liquid tight seals, although other sealing means including molded-in-place gaskets such as silicone caulking could also be used. By the use of means such as tie rods, interconnected cell elements will be maintained under sufficient pressure to provide for all necessary electrolyte and air seals. The bulkhead-to-bulkhead compressive pressure can be transmitted readily through the cell frames. Although a substantially square cell cross section has been depicted, other sections, e.g., circular, can be useful. Moreover, although the cells have been shown in an upright position, it is to be understood that the cell will be operable in other orientation, e.g., on its side so long as the matter of venting of gases is addressed where necessary.

The following example shows a way in which the invention has been practiced but should not be construed as limiting the invention. In the example, air is used in cell operation, but it is to be understood that other serviceable substances exist, e.g., more concentrated oxygen, and can be useful in the present invention.

EXAMPLE

A nine cell test stack is assembled in the manner as discussed hereinabove. The test unit has bulkheads, spacer assembly and cell frame made of CPVC. The perimeter gaskets are made from closed cell foamed EDM rubber and the anode facing gaskets of closed cell foamed polyurethane. The cathode support mesh is a polypropylene mesh and the metal plate is a nickel metal plate having a thickness of 0.025 centimeter (cm.). The modular air cathode is manufactured as described in U.S. Pat. No. 4,693,946, i.e., with crimped edges that are glued and with corners taped. Each broad face of the air cathode is provided with a foraminous, fine mesh screen. The cathode tab elements crimped into the rim of the modular air cathode are of 0.076 millimeter (mm.) nickel foil. In assembly, the anode facing gaskets are glued to the spacer rim of the spacer assemblies. The metal plates are glued to the cathode frames for ease of assembly. The glues used were based upon modified cyanoacrylate esters and on urethane methacrylate esters.

Rectangular shaped aluminum anodes measuring 13.96 by 13.96 by 0.23 cms. are used. The spacing between the anodes and the air cathodes is about 2.2 millimeters. Tie rods are used to connect the bulkheads and are torqued to a firm seal. Air, electrolyte and electrical connections to and from the cell are made at the junctions as noted in accordance with the description hereinabove and in connection with the figures. The electrolyte used is a 5 molar potassium hydroxide at 60° C. and it is introduced at a flow rate of approximately 0.5 gallon per minute. Air at room temperature and soda lime scrubbed to less than 2 ppm. carbon dioxide, is introduced into the cell at a low rate of 21.6 liter per minute, at standard temperature and pressure, which is a rate four times greater than stoichiometric requirements. Under these operating conditions, the cell provides the following: at a current density of 200 milliamps per square centimeter and a cell voltage of 12.6 volts, a total battery power of 2520 watts is supplied for a period of 6 hours.

We claim:

1. A bipolar, filter-press consumable metal anode battery comprising:
   a gas diffusion cathode assembly embodying an electrically conductive metal element, said cathode assembly including a rigid frame member framing a gas diffusion cathode in sheet form, said electrically conductive metal element being firmly held by said frame and extending from said cathode assembly into pressed, electrically conducting contact with
   an electrically conductive, plate-like metal member inert to the environment of said battery and spaced apart from a broad face of said air cathode, with there being adjacent said plate-like metal member
   a consumable metal anode having a broad face in interfacial contact with a broad face of said plate-like metal member.

2. The battery of claim 1, wherein said conductive metal element includes one or more elements in sheet or strip form.

3. The battery of claim 1, wherein said plate-like metal member and metal anode each have facial area larger than the face area of said cathode exposed by said frame.

4. The battery of claim 1, wherein said plate-like metal member is a nickel plate and said consumable metal anode contains one or more of aluminum, zinc, lead, calcium, beryllium, lithium, magnesium, their alloys or intermetallic mixtures.

5. The battery of claim 1, wherein a broad face of said anode not in contact with said plate-like metal member faces a chamber situated between said anode and said cathode, said chamber serving to permit the passage of battery electrolyte between anode and cathode.

6. The battery of claim 5, further characterized by containing electrolyte supply means providing electrolyte to said chamber situated between anode and cathode.

7. The battery of claim 1, wherein a chamber between said plate-like metal member and said cathode contains cathode support means.

8. The battery of claim 1, further characterized by containing gas supply means supplying gas to said battery.

9. The battery of claim 1, wherein said cathode assembly contains a foraminous metal conductor member of planar shape pressed in electrically conductive contact against a planar face of said cathode.

10. The battery of claim 1, wherein said battery comprises a cell stack of like cells.

11. In the method of operating a battery, which battery includes a consumable metal anode, said battery being adapted for use as a bipolar battery, the improvement comprising establishing a compressive force on end members of said battery with there being at least one metal anode therebetween, providing elements within said battery which do not supply compressive force on said anode, transmitting said force from said end members through the elements of said battery including the metal anode and thereby clamping the metal anode of said battery in fixed position while clamping outer peripheral surfaces of said metal anode in a fluid tight seal and maintaining said compressive force through the elements of said battery while introducing electrolyte to said battery and into contact with said consumable metal anode, and withdrawing electrolyte from said battery.

12. The method of claim 11, wherein said force transmitted through said battery clamps a metal anode containing one or more of aluminum, zinc, lead, calcium, beryllium, lithium, magnesium their alloys or intermetallic mixtures.

13. The method of claim 11, wherein said force transmitted through said battery clamps said metal anode at its outer peripheral surfaces in snug, position-stable contact with a gasket element.

14. In a bipolar battery having a consumable metal anode and at least one cell located between a pair of bulkheads, the improvement in said battery for a single bulkhead, of said pair of bulkheads, comprising:
a bulkhead of dielectric material, said bulkhead containing:
gas inlet means permitting entry of gas from outside to within said battery, said gas inlet means connecting to a gas manifold contained within said bulkhead;
spent gas exit means through which spent gas exits said battery;
electrolyte inlet means for feeding electrolyte into said battery, said electrolyte inlet means connecting to an electrolyte manifold contained within said bulkhead; and
electrolyte exit means through which spent electrolyte is withdrawn from said battery.

15. The battery of claim 14, wherein said bulkhead further comprises means for passing electric current through said bulkhead.

16. The battery of claim 14, further characterized by having a planar surface in contact with a plate-like metal anode for said battery.

17. The battery of claim 14, further characterized by being a dielectric, plastic bulkhead.

18. In a unitized electrode module having a sheet electrode assembly in a frame, wherein a sheet electrode member of substantially planar shape is held in tight contact with a frame member having frame edges crimped over said sheet electrode member around the periphery of said member, the improvement in said module comprising flexible, conductive metal elements having end portions compressed within said crimped frame edges in firm, electrically-conductive contact with said sheet electrode member, with the balance of flexible, conductive metal elements projecting forwardly away from said electrode module.

19. The module of claim 18, wherein said conductive elements are thin metal elements.

20. The module of claim 18, wherein said frame is a dielectric frame an said sheet electrode member is a gas diffusion electrode.

21. The module of claim 18, wherein said frame is U-shaped in cross-section with frame edges crimped around the peripheral edges of said sheet electrode member as well as around a portion only of said conductive elements.

22. A bipolar, filter-press consumable metal anode battery assembly comprising:
a housing for a cell of said battery, said housing having passages for gas to and from a gas diffusion cathode, said gas passages being channels cut within said cell housing;
a gas diffusion cathode frame housed within said cell housing and having electrically conductive metal members extending from said cathode frame, with said conductive metal members including tab elements spaced apart one from the other; and
a metal anode assembly to which said conductive metal members extend; and wherein
said passages for gas to and from said cathode are positioned within the spaces interposed between adjacent conductive metal member tab elements extending from said cathode frame, whereby said channels supply gas between said tab elements to said gas diffusion electrode.

* * * * *